May 16, 1933.   A. O. JAEGER   1,909,356
CATALYTIC DEHYDRATION OF ALCOHOLS
Original Filed Feb. 27, 1928   5 Sheets-Sheet 1
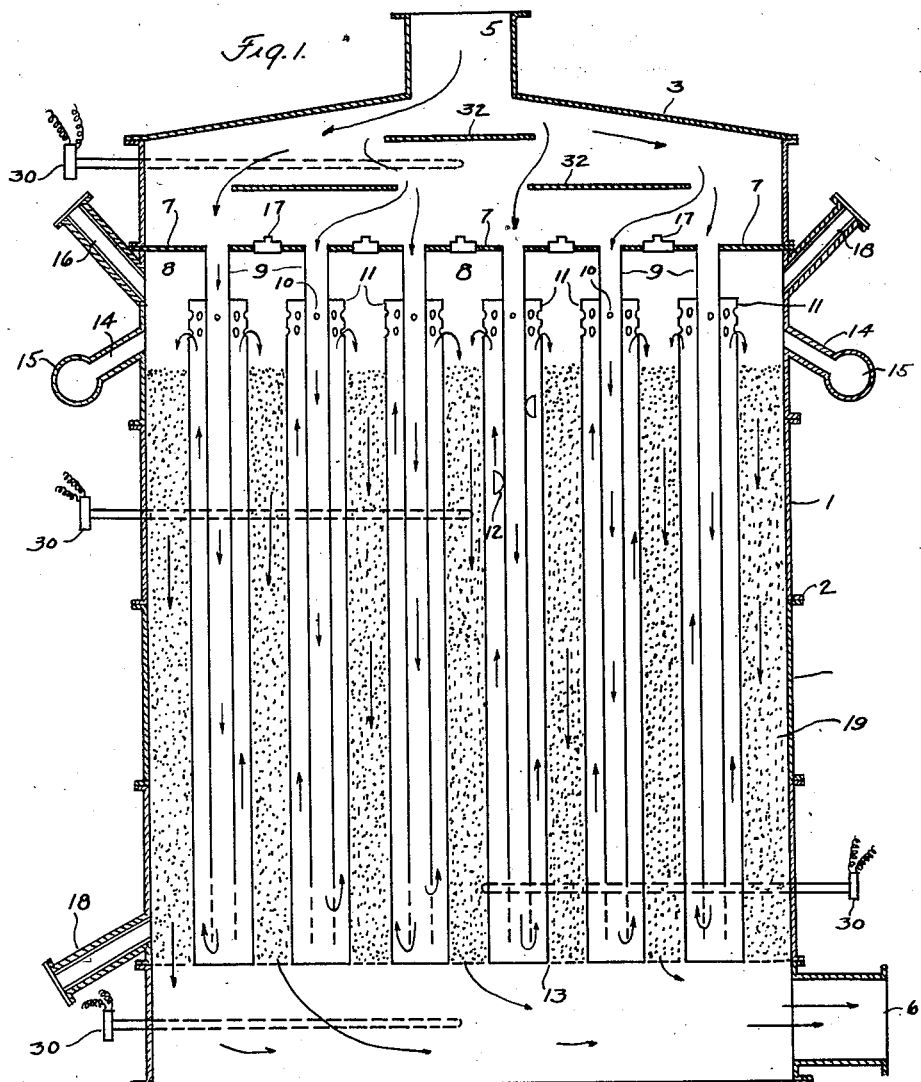
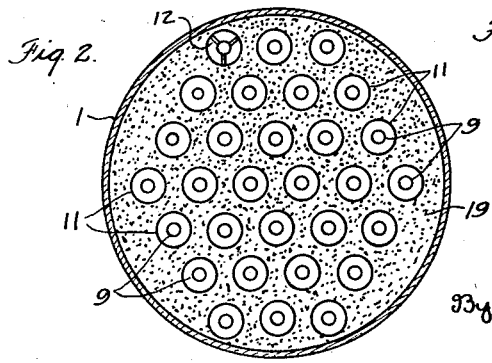
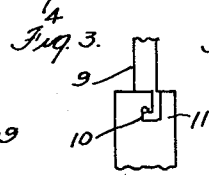
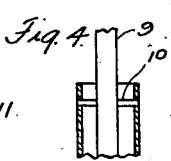
Alphons O. Jaeger
Inventor May 16, 1933. A. O. JAEGER 1,909,356
CATALYTIC DEHYDRATION OF ALCOHOLS
Original Filed Feb. 27, 1928 5 Sheets-Sheet 2
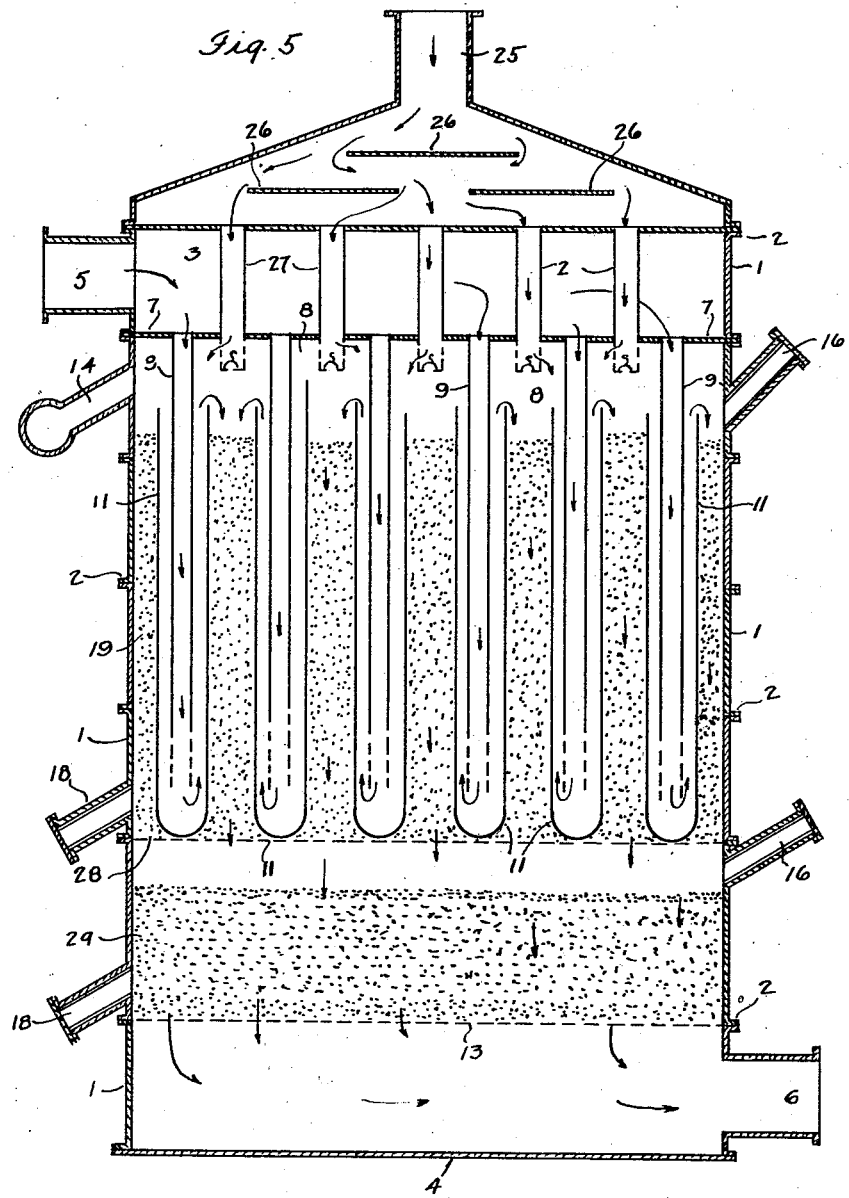
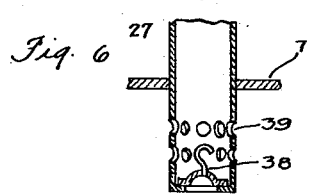
Alphons O. Jaeger
Inventor
By Robert Ames Norton
Attorney

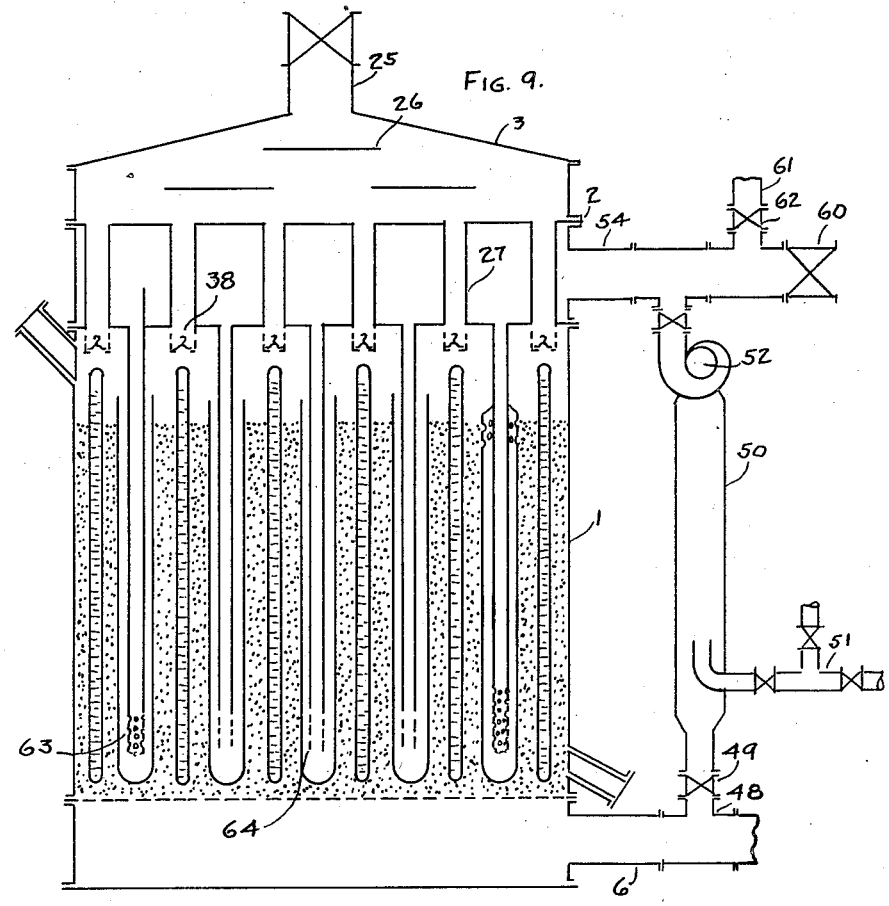

May 16, 1933.  A. O. JAEGER  1,909,356
CATALYTIC DEHYDRATION OF ALCOHOLS
Original Filed Feb. 27, 1928  5 Sheets-Sheet 5

Alphons O. Jaeger
Inventor

By Robert Ames Norton
Attorney

Patented May 16, 1933

1,909,356

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

CATALYTIC DEHYDRATION OF ALCOHOLS

Original application filed February 27, 1928, Serial No. 257,343. Divided and this application filed June 13, 1929. Serial No. 370,642.

This invention relates to the splitting off of hydrogen or oxygen containing groups from organic compounds in the vapor phase and more particularly to methods of controlling the temperature of such reactions.

A number of reactions involving the splitting off of groups containing hydrogen or oxygen, such as dehydrogenations, dehydrations, splitting off of carbon dioxide or amino groups from organic compounds are carried out in the vapor phase in the presence of suitable catalysts. A number of representative reactions of this type are the following:

Dehydrogenation reactions, such as, alcohols to corresponding aldehydes and ketones, e. g. methyl alcohol to formaldehyde, cyclohexanol and the derivatives of it to cyclohexanone and the corresponding derivatives, isopropyl alcohol to acetone, secondary butyl alcohol to methyl ethyl ketone; dehydration, e. g. ethyl alcohol to ethylene; isopropyl alcohol to propylene; the splitting off of carboxyl groups from polycarboxylic acids, e. g. phthalic acid to benzoic acid.

The reactions involving splitting off of groups require in some cases a careful temperature control. Some of the reactions are exothermic, others endothermic, but in all cases the reaction temperature throughout the catalyst zone should be controlled as simple, uniformly, and automatically as possible. The processes of the present invention effect this desired temperature control in a simple and elegant manner by causing the reaction gases to flow in double counter current heat exchange elements in the catalyst, the first flow being in indirect heat exchanging relation with the catalyst, that is to say, in heat exchanging relation thru an intermediate gas stream instead of a stationary wall, the gas flow then being reversed and passed in direct heat exchanging relation with the contact mass and with the incoming gases on their first flow and finally after a second reversal the gases are permitted to flow directly through the contact mass. The double counter current flow permits gradual heating of the reaction gases to the reaction temperature or in the case of endothermic reactions maintaining the catalyst at reaction temperature and the effective heat exchange controls the temperature of the reaction in the most satisfactory manner. The heating or cooling effect of the reaction gases is proportional to the amount flowing through the converter, that is to say their speed, because of the highly effective heat exchanging features of the present invention. The heat evolved or absorbed in the reaction is, of course, also proportional to the amount of reaction gases passing through in unit time within working ranges of conversion. Since, therefore, the temperature regulating effect and the heat evolved or absorbed in the reaction are proportional to reaction gas speed the temperature control will be substantially uniform throughout wide fluctuations of reaction gas flow, a most important feature in maintaining effective reaction control. The converter structure which is made possible by features of the present invention is very cheap and lends itself to reactions which take place under high pressure as well as those carried out at atmospheric pressure since, as will be described further on in connection with specific modifications, no gas-tight joints are required in the interior of the converter, an enormous advantage in high pressure work. The automatic temperature control also makes it possible to operate installations using the processes of the present invention with a minimum of supervision and particularly with a minimum of skilled supervision, thus making great operating savings possible.

In addition to the primary feature of the present invention, that is to say the double counter current heat exchange flow of reaction gases, it is desirable in many reactions, such as equilibrium reactions, to recirculate all or part of the reaction gases with or without complete removal of reacted products therefrom. This feature which greatly enhances the controlling capacity of the double counter current heat exchange is included in some of the more specific embodiments of the present invention. Additional reaction uniformity can be assured by the provision of temperature equalizing elements which are preferably bodies of high heat conductivity, such as metals or compartments filled with liquids, boiling or non-boiling, the elements being distributed through the contact mass and advantageously being parallel to the double counter current heat exchange elements. This permits a very desirable temperature regulation, particularly along the heat exchange elements and is of advantage in connection with the automatic temperature control features of the present invention where extreme uniformity of reaction temperatures and highly effective control is necessary. One or more of the above additional features, that is to say recirculation of gases and heat equalizing means, may be incorporated with the main feature of double counter current heat exchange wherever the nature of the reaction or of the installation renders the additional control obtainable by this feature of importance.

It is desirable in some cases to use metals in the converter structure which either do not have any deleterious catalytic effect or which favor the particular reactions. Thus, it is desirable in some cases to construct the converter or plate the portions contacting with the gases with such elements as aluminum, copper, silver, and the like. Alloy steels, such as chrome steels, vanadium steels, molybdenum steels, are also effective in many cases. It is also desirable for certain reactions to inactivate the converter surfaces by coating them with compounds, such as stabilizer compounds which do not have catalytic activity or active catalysts or stabilizer promoters. The invention, of course, is not limited to the use of any particular metal or to inactivating, but these features may be employed wherever their use appears desirable.

The invention will be described in greater detail in connection with the drawings in which Fig. 1 is a vertical cross section through a converter showing the automatic gas cooling feature of the present invention;

Fig. 2 is a horizontal cross section through Fig. 1;
Figs. 3 and 4 are details of the method of attaching the double counter current heat exchange elements.

Fig. 5 is a vertical section through a modified converter provided with auxiliary gas introducing means and with an uncooled catalyst layer.

Fig. 6 is a detail of the gas distributors shown in Fig. 5;

Figs. 7 and 8 are details of the heat equalizing means shown in Figs. 9 and 10;

Fig. 9 is a vertical section through a converter showing recirculating and temperature equalizing means;

Figure 13:
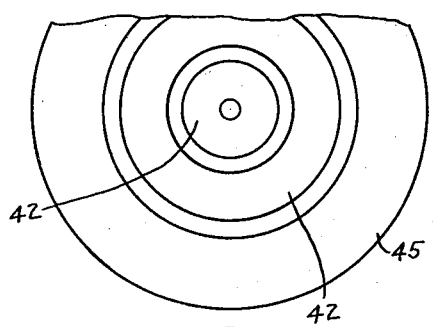
Figure 12:
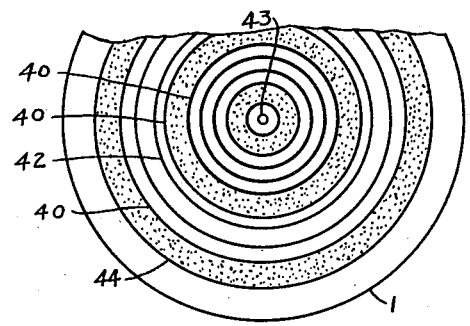
Figure 11:
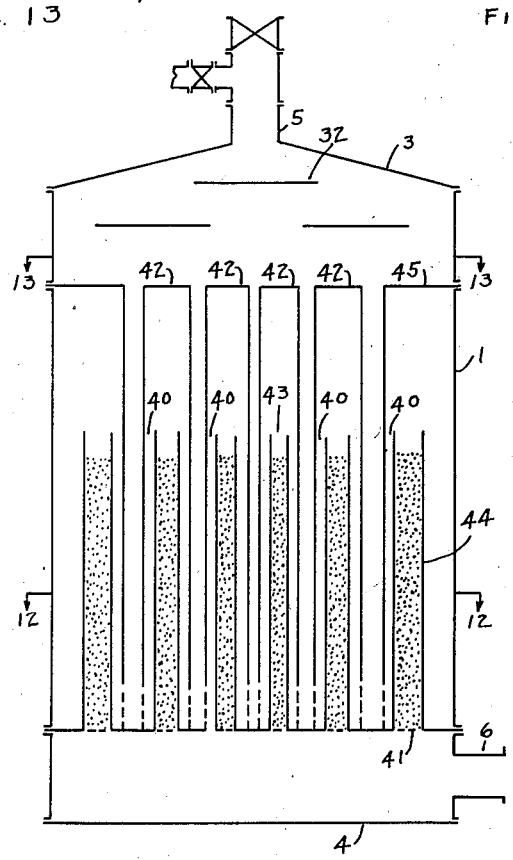

Fig. 11 is a vertical section through a converter having annular heat exchange elements; and Figs. 12 and 13 are horizontal sections along the lines of 12—12 and 13—13 of Fig. 11.

In the drawings in Fig. 1 the catalyst is conventionally shown by stippling as in the remaining figures. It should be understood that the representation of the catalyst is only a conventional representation and the invention is not in any sense limited to the use of particular types or shapes of catalysts.

The converter shown on Fig. 1 consists of an outer shell formed of rings 1 provided with flanges 2 and connected to a top piece 3 and bottom piece 4. The reaction gases enter the top piece through the pipe 5, are distributed by means of the baffles 32 and thence pass down through the central cooling tubes 9 and then up in the outer cooling tubes 11 in the opposite direction. The tubes 11 are attached to the inner tubes 9 by any suitable fastening such as a bayonet fastening illustrated in Figs. 3 and 4, the pin 10 entering into the bayonet slot in the tube 11. Other fastenings such as short chains, hooks and the like may also be employed. The inner cooling tubes 9 are, of course, firmly mounted in the top plate 7 and the alignment of tubes 9 and 11 may be preserved by spacing lugs 12.

The gases after passing up through the tubes 11 emerge through perforations at the top of the tubes into the upper gas space 8 and thence down through the catalyst 19. The catalyst is retained by the sieve or perforated bottom 13 through which the reacted gases pass into the lower space of the converter and thence out through the exhaust pipe 6.

Catalyst can be introduced either through the side openings 16 or through the openings in the plate 7 which are closed by the plugs 17. Catalyst can be removed through the outlet 18. The pipes 16 and 18 may, if desired, be filled with suitable inert material. Temperatures at various points are measured by the thermometric elements 30 which are illustrated in the form of electric pyrometers, but may, of course, be of any other suitable type. Where additional cooling gases are desired at the surface of the catalyst where the most violent reaction takes place, these gases may be introduced through the pipes 14 from the collector pipe 15.

In operation, the cold or cooled gases entering first pass down through the tubes 9 in indirect heat exchanging contact with the catalyst but in direct heat exchanging relation with the ascending gases in tubes 11. The gases are thus gradually warmed up and after emerging from the open end of tubes 9, they rise in tubes 11 in direct heat exchanging relation with the catalyst and in counterflow to the flow of gases through the catalyst. In the case of exothermic reactions, the catalyst is very hot and the gases in ascending the tubes 11 are rapidly and progressively heated, the rise in temperature being somewhat moderated by the cooling action of the down flowing gases in tubes 9 so that the gases emerging from the top of tubes 11 are not at an excessively high temperature. The heated reaction gases, with or without further addition of cool or cold gases through the pipes 14, then pass through the catalyst where the reaction takes place. The catalyst, however, does not become overheated as it is in intimate heat exchanging relation with the tubes and is cooled by the incoming gases. Too violent reaction in the upper zones of the catalyst is effectively prevented by the fact that the gases contacting with the upper layers of the catalyst are partly cooled by the gases in the tubes 9 and may be mixed with a suitable amount of cold or cooler gases through the pipes 14.

It will be seen that the converter heats up in a steady, regular manner the incoming cold gases and at the same time the catalyst itself is cooled. All of the heat of the catalyst or substantially all is thus utilized for heating the incoming gases and the manner of flow permits a very even cooling action while at the same time, the provision of the pipes 14 makes it possible to control sudden increases in temperature in the upper catalyst zones by a sudden and large increase in the inflow of cold or cooler gases. Where the reaction does not produce excessive heat per unit of reacting gases or where sudden overheating of the catalyst is not to be feared, the auxiliary cool gas pipes 14 may be dispensed with.

The heat evolved throughout the catalyst is, of course, by no means uniform since by far the greatest percentage of reaction and correspondingly of heat evolution takes place in the first catalyst layers and a rather steep temperature gradient may therefore, exist in the catalytic layers from the top to the bottom. This temperature gradient is effectively utilized by causing the cold gases emerging from the bottom of the tubes 9 to come into heat exchanging relation first with a portion of the catalyst which is at a relatively low temperature and then as they are heated up and as they rise in the tubes 11, the gases come into contact with progressively hotter and hotter catalyst so that at all times, the gases are subjected to a temperature differential sufficient to cause a large and steady flow of heat from the catalyst to the gases. At the same time, the excessive temperatures which might otherwise be produced in the upper catalyst layers are to some extent moderated by the fact that the rising gases not only absorb heat from the catalyst, but also give off a certain increasing amount of heat to the incoming cold gases in the tubes 9.

The converter operation has been described in connection with an exothermic reaction in which the catalyst serves to heat up the reaction gases. Of course in an endothermic reaction the roles are reversed and the catalyst is uniformly heated up by the reaction gases. The same effective temperature control is, however, obtained.

An example of reactions which can be carried out in the converter shown in Figs. 1 to 4 is the dehydrogenation of alcohols to form the corresponding olefine compounds. A catalyst is prepared by spraying onto quartz filter stones an aqueous mixture of thorium and aluminum oxide in the ratio of 2:1, freshly precipitated from the corresponding nitrates by means of ammonia. The stones are preferably kept in a coating pan and heated up to temperatures above 100° C. so that the water of the suspension is instantaneously vaporized on striking the filter stones. By these means a very uniform coating can be obtained. The contact mass is filled into the converter as shown in Fig. 9 and ethyl alcohol vapors are passed over it at 340–380° C. Excellent yields of ethylene are obtained and after separating out ethylene and water the unreacted ethyl alcohol can be recirculated. Good yields of the products are obtained and the reaction proceeds smoothly and uniformly, thanks to the uniform temperature made possible by the features of the present invention.

In the construction of Figs. 5 and 6 the double counter current heat exchange cooling is supplemented by means for direct introduction of gases into the contact mass without passing through the heat exchange elements. Similar structures bear the same reference numerals as in Fig. 1.

In addition to the perforated partition 7 a further perforated partition is provided above the former from which pipes 27 pass down through the partition 7 and are provided with removable baffle plates 38 and perforations 39. Gases are introduced through the pipe 5 into the space between the two and flow through the counter current heat exchange elements as in the structure shown in Fig. 1. Auxiliary gases may be introduced into the top of the converter through pipe 25 and after mixing by means of the baffle plates 26 flow directly down through the pipes 27. This auxiliary gas introduction may be used continuously or as an emergency measure to reduce excessive temperatures should the latter obtain for any reason.

In addition to auxiliary gas introduction the converter is provided with an uncooled catalyst layer supported by a screen 13 below the layer cooled with automatic heat exchange devices. This additional layer serves to clean up any unreacted gases which may pass through the cooled layer.

The converter shown in Fig. 9 may be used for the reactions described in connection with the converter shown in Fig. 1 or may be used for dehydrations of alcohols to aldehydes or ketones.

Fig. 9 illustrates a converter of the general type shown in Fig. 5 but provided with means for recirculating part of the gases and with temperature equalizing means. Similar parts bear the same reference numerals as in Fig. 5. The heat exchange elements are shown with slight modification, such as the provision of perforations or slots 63 and 64 in the bottom of some of the inner tubes of the double counter current heat exchange elements to force the gases to leave the tube over a larger area and thus prevent a blast of cold gas striking the bottom of the outer tubes and unduly cooling the immediately adjacent portion of the contact mass. It may also be desirable to close the upper ends of the outside tubes of the heat exchange elements as shown in the extreme right-hand element in the figure. This also aids in causing the gases to enter the catalyst over a larger area. Part of the exhaust gases leaving through a branch pipe 48 controlled by a valve 49 into a mixing chamber 50 in which additional reaction components may be introduced if desired through the valved pipe 51. The gases then enter the blower 52 and are forced into the pipe 54 which leads to the portion of the converter between the two perforated partitions and the recirculated gases with or without admixture of fresh gases then pass through the heat exchange elements. Additional fresh gases may be introduced directly through the pipe 54 by manipulation of valve 60 or may be introduced through the branch pipe 61 controlled by the valve 62. All of the fresh gases may be introduced through the pipe 25 or part may be introduced through the recirculating system. The recirculation increases the capacity of the heat exchange elements and as the same gas is used over several times and is advantageous in producing a more uniform and a finer temperature control. The reaction products are relatively stable and are not attacked by the catalysts during recirculation. In order to enhance the uniformity of temperature control and particularly to aid in preventing steep temperature gradients the temperature equalizing elements 55 which may be metal rods or as shown compartments filled with liquids of high heat conductivity or which boil at about the reaction temperature serve to conduct heat from the hotter catalyst zones to the colder and aid in the temperature regulation.

More elaborate construction of temperature equalizing means are shown in Figs. 7 and 8 and may be used wherever desirable. In Fig. 7 the compartment 55 is provided with a central tube 65 carrying perforations 66 at its lower end. A very markedly increased circulation of the liquid in the compartment is thereby effected. In Fig. 8 an element similar to that shown in Fig. 7 is provided with an external jacket 67 filled with a liquid 68. This is an effective construction where a boiling liquid is used in the compartment 55 as the jacket with its liquid, which is preferably non-boiling, serves to smooth out heat fluctuations and also permits the use of much smaller quantities of boiling liquid which is frequently more expensive than non-boiling liquids as it is usually necessary to use mercury alloys for this purpose. It will be clear, of course, that temperature equalizing elements of all kinds may be used in the converters of Figs. 1 to 5 as well as in converters provided with recirculation.

The recirculating system should preferably be provided with suitable means for removing part or all of the reacted components and any of the well-known designs may be used. As the particular structural features of these devices form no part of the invention they are omitted from the drawings for the sake of simplicity. This converter is admirably suited for effecting the dehydrogenation of alcohols, and permits an even closer regulation of the reaction temperature.

A reaction which can be effectively carried out in Fig. 9 is the dehydration of ethyl alcohol to ethylene.

Figure 10:
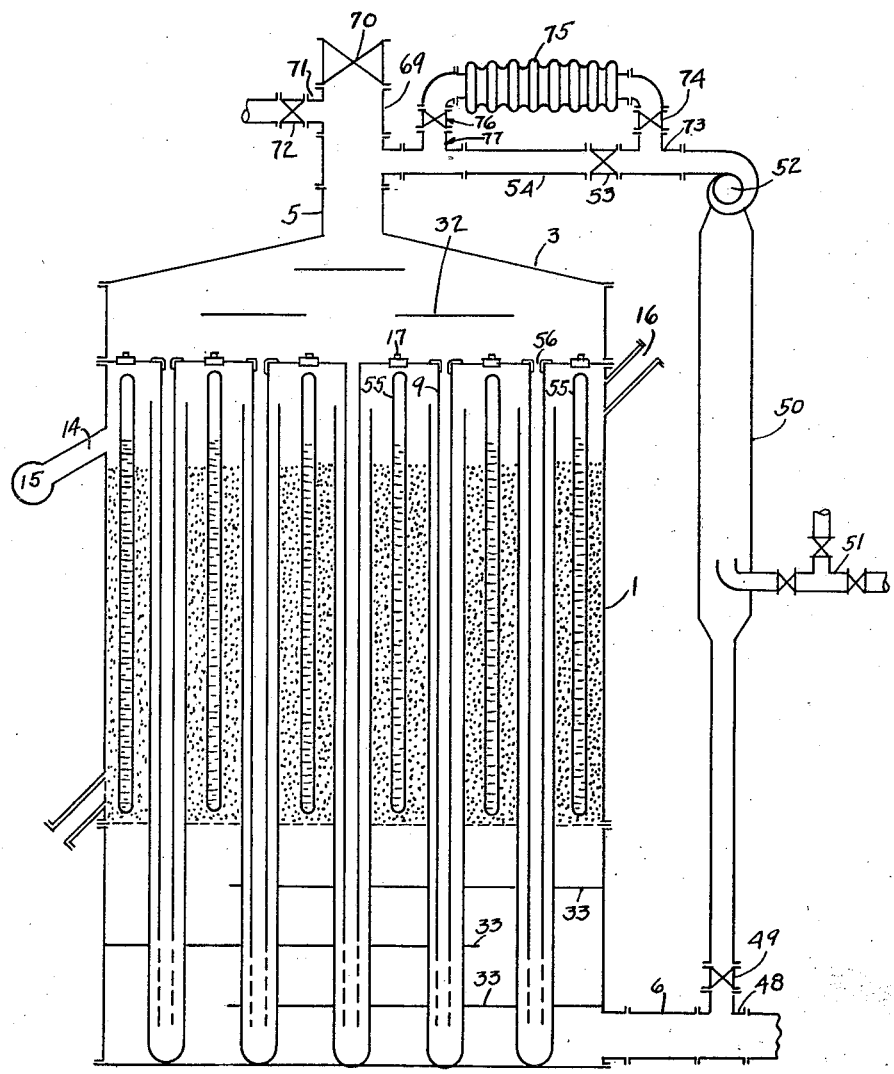
Fig. 10 is a vertical section through a converter showing recirculating means with an external cooler and an internal heat exchanger.

Fig. 10 illustrates a converter provided with recirculation. In this converter the double counter current heat exchange elements extend below the catalyst and the lower chamber of the converter is transformed into an internal heat exchanger by the baffles 33 which cause the reacted gases to pass over the extended heat exchange elements in a tortuous path. This permits a very effective utilization of the heat of reaction in preheating the entering reaction mixture which makes it possible in many cases to dispense more or less with preheating from an external source.

The converter also shows another feature, namely, the provision of so-called orifice plugs 56. These plugs of varied apertures are mounted in the inner tubes of the heat exchangers so as to restrict the flow through the peripheral heat exchangers in comparison to the central heat exchangers thereby compensating for the peripheral cooling effect of the converter shell which in many cases is considerable in spite of thorough insulation. The drawings, of course, are purely diagrammatical and do not show such structural features as insulation and the like. The recirculated gases after entering the pipe 54 are provided with a cooling by-pass through the corrugated cooler or heater 75 which connects to the pipe 54 through the pipes 73 and 77 controlled by the valves 74 and 76 and valve 53 is also provided in the pipe 54 intermediate between the points where the pipes 73 and 77 enter the latter. The recirculation is directly into the gas intake in pipe 5, the latter is shown as provided with a fresh gas control valve 70 and with a branch pipe 71 controlled by a valve 72 for auxiliary gas introduction. The construction in Fig. 10 permits a very desirable heat economy and accurate control of temperature as the amount of recirculation and the cooling taking place during the recirculation can be controlled with great nicety with suitable adjustment of the valves as will be clear to a skilled engineer. It will be obvious, of course, that the various features shown may also be applied to other converters, thus, for example, the provision of cooling in the recirculating system may, of course, be applied to converters which do not have extended heat exchange elements and conversely converters which are not provided with recirculation may be constructed with heat exchange elements extending below the catalyst and will, of course, enjoy the benefits which accrue from this type of construction. In fact the drawings are intended to illustrate a few embodiments of the principles of the process of the present invention which is not limited to the precise features set forth therein.

This type of converter can, of course, be used for the reactions described in connection with the converter of Figures 1, 5 and 9.

Figs. 11 to 13 illustrate a converter similar to Figs. 1 to 4 in which the heat exchange elements consist of the concentric annuli instead of tubes. Into the lower annuli 40 with open tops extend inverted annuli 42 with open bottoms. The central lower annulus is, of course, a tube 43 and the outside lower annulus 44 and upper annulus 45 utilize the converter shell as one wall. The flow of gases is identical with that in Fig. 1 as will be apparent from the study of Fig. 11 but the annular construction is more compact and presents certain advantages in uniform catalyst distribution and increased heat exchange surfaces in contact with the catalyst. As can be seen from Figs. 11 and 12, the catalyst is placed between the successive lower annuli.

This case is a division of my co-pending application, Serial No. 257,343, filed February 27, 1928.

What is claimed as new is:

1. A method of dehydrating alcohols to unsaturated hydrocarbons which comprises vaporizing the compound to be dehydrated, passing the vapors through heat exchanging elements at least partly embedded in a layer of dehydration catalyst, the vapors being in indirect heat exchanging relation with the catalyst, reversing the flow of vapors, and causing them to be in direct heat exchanging relation with the catalyst and with the incoming vapors during reverse flow, again reversing the vapor flow and causing them to pass through the catalyst layer.

2. A method of producing olefines which comprises vaporizing the corresponding paraffin alcohols, passing the vapors through heat exchange elements at least partly embedded in a layer of dehydration catalyst, the vapors being in indirect heat exchanging relation with the catalyst, reversing the flow of vapors and causing them to be in direct heat exchanging relation with the catalyst and with the incoming vapors during reverse flow, again reversing the vapor flow and causing them to pass through the catalyst layer.

3. A method of producing ethylene which comprises vaporizing ethyl alcohol, passing the vapors through heat exchange elements at least partly embedded in a layer of dehydration catalyst, the vapors being in indirect heat exchanging relation with the catalyst, reversing the flow of vapors, and causing them to be in direct heat exchanging relation with the catalyst and with the incoming vapors during reverse flow, again reversing the vapor flow and causing them to pass through the catalyst layer.

4. A method according to claim 1, in which additional gas is caused to flow directly through a dehydration catalyst without passing through the heat exchangers.

5. A method according to claim 1, in which the temperature of the vapors passing through a dehydration catalyst is equalized by temperature equalizing elements of high heat conductivity.

6. A method according to claim 1, in which the temperature of the vapors passing through a dehydration catalyst is equalized by temperature equalizing elements of high heat conductivity, consisting of chamber filled with liquids capable of rapid transport of heat.

7. A method according to claim 1, in which at least part of the reacted gases are recirculated.

8. A method according to claim 1, in which at least part of the reacted gases are recirculated and at least a portion of the reacted products is removed during recirculation.

9. A method according to claim 1, in which the vapors during a portion of their flow through the double counter current heat exchange elements are subjected to heat exchange with the reacted gases after the latter have passed through a dehydration catalyst.

Signed at Pittsburgh, Pennsylvania, this 12th day of June, 1929.

ALPHONS O. JAEGER.